(12) United States Patent
Hoehle

(10) Patent No.: US 11,002,362 B2
(45) Date of Patent: *May 11, 2021

(54) SHAFT SEAL ASSEMBLY

(71) Applicant: Inpro/Seal LLC, Rock Island, IL (US)

(72) Inventor: Neil F. Hoehle, Solon, IA (US)

(73) Assignee: Inpro/Seal LLC, Rock Island, IL (US)

( * ) Notice: Subject to any disclaimer, the term of this patent is extended or adjusted under 35 U.S.C. 154(b) by 52 days.

This patent is subject to a terminal disclaimer.

(21) Appl. No.: 16/272,826

(22) Filed: Feb. 11, 2019

(65) Prior Publication Data

US 2019/0170256 A1    Jun. 6, 2019

Related U.S. Application Data

(63) Continuation of application No. 15/186,918, filed on Jun. 20, 2016, now Pat. No. 10,203,036.

(Continued)

(51) Int. Cl.
*F16J 15/3276*     (2016.01)
*F16J 15/447*      (2006.01)
(Continued)

(52) U.S. Cl.
CPC ......... *F16J 15/3276* (2013.01); *F16C 33/782* (2013.01); *F16C 33/7886* (2013.01);
(Continued)

(58) Field of Classification Search
CPC ...... F16J 15/00; F16J 15/3276; F16J 15/3268; F16J 15/008; F16J 15/16; F16J 15/50;
(Continued)

(56) References Cited

U.S. PATENT DOCUMENTS

| 2,014,859 A | 9/1935 | Mitchell, Jr. |
| 2,879,093 A | 3/1959 | Dolhum |

(Continued)

FOREIGN PATENT DOCUMENTS

| CN | 201339717 | 11/2009 |
| CN | 101761650 A | 6/2010 |

(Continued)

OTHER PUBLICATIONS

International Search Report and Written Opinion PCT/US2016/038348, dated Oct. 6, 2016.

(Continued)

*Primary Examiner* — Nathan Cumar
(74) *Attorney, Agent, or Firm* — Fish & Richardson P.C.

(57) ABSTRACT

A shaft seal assembly may include a stator and a rotor. The rotor may be configured to rotate with a shaft, and the stator may be engaged with a housing. The stator and rotor may be configured with radial and/or axial recesses and/or radial and/or axial projections. These various features may be configured such that the stator and rotor cooperate to form a ring cavity. A cooperating ring may be positioned in the ring cavity, and the cooperating ring may be configured such that is circumferentially expandable so that the cooperating ring changes size and/or shape when it rotates as opposed to when it is not rotating.

18 Claims, 15 Drawing Sheets

Related U.S. Application Data

(60) Provisional application No. 62/181,644, filed on Jun. 18, 2015.

(51) Int. Cl.
*F16J 15/00* (2006.01)
*F16J 15/16* (2006.01)
*F16C 33/78* (2006.01)
*F16C 33/80* (2006.01)

(52) U.S. Cl.
CPC ........... *F16C 33/805* (2013.01); *F16J 15/008* (2013.01); *F16J 15/164* (2013.01); *F16J 15/4478* (2013.01)

(58) Field of Classification Search
CPC ........ F16J 15/52; F16J 15/164; F16J 15/4478; F16C 33/782; F16C 33/7823; F16C 33/7826; F16C 33/7886; F16C 33/7889; F16C 33/82; F16C 33/805; F16C 33/80; F16C 33/761
USPC ......................................................... 277/500
See application file for complete search history.

(56) References Cited

U.S. PATENT DOCUMENTS

| | | |
|---|---|---|
| 3,042,417 A | 7/1962 | Einar et al. |
| 3,062,554 A | 11/1962 | Mcgahan et al. |
| 3,117,792 A | 1/1964 | Glenn et al. |
| 3,127,181 A | 3/1964 | Crego et al. |
| 3,168,871 A | 2/1965 | Sieghartner |
| 3,218,085 A | 11/1965 | Grace |
| 3,343,891 A | 9/1967 | Shipman |
| 3,583,710 A | 6/1971 | Burelle |
| 3,602,559 A | 8/1971 | Hirschler |
| 3,697,088 A | 10/1972 | Hummer |
| 4,022,479 A | 5/1977 | Orlowski |
| 4,114,902 A | 9/1978 | Orlowski |
| 4,175,752 A | 11/1979 | Orlowski |
| 4,304,409 A | 12/1981 | Orlowski |
| 4,415,166 A | 11/1983 | Beia |
| 4,460,180 A | 7/1984 | Koistinen |
| 4,466,620 A | 8/1984 | Orlowski |
| 4,471,964 A | 9/1984 | Kotzur |
| 4,484,754 A | 11/1984 | Ballard |
| 4,679,801 A | 7/1987 | Poloni |
| 4,706,968 A | 11/1987 | Orlowski |
| 4,743,034 A | 5/1988 | Kakabaker et al. |
| 4,832,350 A | 5/1989 | Orlowski |
| 4,890,941 A | 1/1990 | Calafell et al. |
| 4,989,883 A | 2/1991 | Orlowski |
| 5,024,451 A | 6/1991 | Borowski |
| 5,028,054 A | 7/1991 | Peach |
| 5,069,461 A | 12/1991 | Orlowski |
| 5,074,567 A | 12/1991 | Orlowski |
| 5,137,049 A | 8/1992 | Orlowski |
| 5,158,304 A | 10/1992 | Orlowski |
| 5,161,804 A | 11/1992 | Orlowski et al. |
| 5,174,583 A | 12/1992 | Orlowski et al. |
| 5,221,095 A | 6/1993 | Orlowski |
| 5,335,921 A | 8/1994 | Orlowski |
| 5,378,000 A | 1/1995 | Orlowski |
| 5,498,006 A | 3/1996 | Orlowski |
| 5,658,127 A | 8/1997 | Bond et al. |
| 5,865,441 A | 2/1999 | Orlowski |
| 5,904,356 A | 5/1999 | Mundy |
| 5,951,020 A | 9/1999 | Orlowski |
| 5,957,462 A | 9/1999 | Nishiyama et al. |
| 5,967,524 A | 10/1999 | Fedorovich |
| 6,062,568 A | 5/2000 | Orlowski et al. |
| 6,182,972 B1 | 2/2001 | Orlowski |
| 6,234,489 B1 | 5/2001 | Orlowski et al. |
| 6,311,984 B1 | 11/2001 | Orlowski |
| 6,419,233 B2 * | 7/2002 | Orlowski .............. F16J 15/4478 277/411 |
| 7,052,014 B1 | 5/2006 | Orlowski et al. |
| 7,090,403 B2 | 8/2006 | Orlowski et al. |
| 7,396,017 B2 | 7/2008 | Orlowski et al. |
| 7,521,827 B2 | 4/2009 | Orlowski et al. |
| 7,631,878 B1 | 12/2009 | Orlowski et al. |
| 7,726,661 B2 | 6/2010 | Orlowski et al. |
| 7,839,294 B2 | 11/2010 | Orlowski et al. |
| 8,130,113 B1 | 3/2012 | Orlowski et al. |
| 8,604,653 B2 | 12/2013 | Orlowski et al. |
| 8,664,812 B2 | 3/2014 | Vicars et al. |
| 8,979,093 B2 | 3/2015 | Orlowski et al. |
| 9,004,491 B2 | 4/2015 | Orlowski et al. |
| 9,048,603 B2 | 6/2015 | Vicars et al. |
| 9,071,092 B2 | 6/2015 | Hoehle et al. |
| 1,020,303 A1 | 2/2019 | Hoehle |
| 2001/0002742 A1 * | 6/2001 | Orlowski .............. F16J 15/4478 277/361 |
| 2002/0167131 A1 * | 11/2002 | Orlowski .............. F16J 15/4478 277/371 |
| 2008/0044279 A1 * | 2/2008 | Orlowski .............. F04D 13/021 415/175 |
| 2008/0063330 A1 * | 3/2008 | Orlowski ............... B65G 39/09 384/448 |
| 2008/0078648 A1 | 4/2008 | Orlowski et al. |

FOREIGN PATENT DOCUMENTS

| | | |
|---|---|---|
| CN | 101900208 A | 12/2010 |
| CN | 103097780 A | 5/2013 |
| TW | M419631 | 1/2012 |
| WO | 0011380 A1 | 3/2000 |
| WO | 2007001525 A2 | 1/2007 |
| WO | 2014100515 A1 | 6/2014 |

OTHER PUBLICATIONS

PCT/US2016/028667, ISR & Opinion, International Searching Authority, Korean Intellectual Property Office, dated Aug. 4, 2016.
Supplementary European Search Report, European Patent Office, dated Aug. 30, 2019.
EP Office Action in European Appln. No. 16812613.4, dated Dec. 4, 2020, 4 pages.
IN Office Action in Indian Appln No. 201827001173, dated Dec. 9, 2020, 6 pages (with English Translation).

* cited by examiner

SHAFT SEAL ASSEMBLY

CROSS REFERENCE TO RELATED APPLICATIONS

This patent application is a continuation of and claims priority from U.S. patent application Ser. No. 15/186,918 (now U.S. Pat. No. 10,203,036) filed on Jun. 20, 2016, which claims the priority of provisional U.S. Pat. App. No. 62/181,644 filed on Jun. 18, 2015, all of which are incorporated herein in their entireties.

FIELD OF THE INVENTION

The present invention relates to a shaft seal assembly and/or bearing isolator with multiple embodiments. In certain embodiments, the shaft seal assembly may employ a dynamic ring on an interior portion thereof.

STATEMENT REGARDING FEDERALLY SPONSORED RESEARCH OR DEVELOPMENT

No federal funds were used to create or develop the invention herein.

REFERENCE TO SEQUENCE LISTING, A TABLE, OR A COMPUTER PROGRAM LISTING COMPACT DISK APPENDIX

N/A

BACKGROUND OF THE INVENTION

Bearings and bearing housing seals may be responsible for the majority of rotating equipment failures. There is a close relationship between the lives of these two critical components. The failure of a bearing housing seal may cause the bearings to fail and poor bearing conditions can reduce rotating equipment life. It is estimated that a small number of bearings achieve their minimum design life of from 24,000 to 40,000 hours (3 to 5 years). Rain, product leakage, debris, and wash-down water entering the bearing housing may contaminate the bearing lubricant and have a catastrophic effect on bearing life. Very small amounts of water can compromise bearing life. A contamination level of 0.002% water in the lubricating oil can reduce bearing life by as much as 48%. As little as 0.10% water is reported to reduce bearing life by as much as 90%.

Auxiliary mechanical equipment shaft seals, sometimes called bearing isolators or sealing rings, have become increasingly important to modern mechanical equipment, especially for equipment called upon to operate in hostile applications. For example, mechanical power transmission units used in rock quarries are often subjected to highly abrasive dust particles. Elastomeric lip or O-ring shaft seals can quickly wear out and fail in environments such as these. Dust and exterior contaminants cannot be excluded from the interior of the transmission housing by a failed standard sealing device. Nor can oil or other fluids be prevented from leaking out of the transmission devices past a worn lip seal.

To prevent the ingress of corruption and the egress of lubricating fluids, a number of auxiliary or improved primary sealing arrangements and devices have been provided. Some of these sealing devices provide a physical engagement of the shaft and a wiping action while the shaft operates. Other devices provide an interengagement and wiping action between seal parts. But in both such arrangements, the inevitable friction causes inevitable part wear.

For example, lip seals, commonly known as oil seals, are a well-established method of protecting bearing housings from water, dust, chemical or steam contamination. Lip seals normally involve a stationary elastomeric lip or lips touching the rotating shaft or sleeve at an angle so that contaminants are excluded from the housing. While lip seals have a low initial cost, lip seals have a short protection life, approximately 3,000 hours, due to wear of the elastomer or the shaft itself.

Another type of seal is a labyrinth device that contains a tortuous path that makes it difficult for contaminants to enter the bearing housing to degrade lubricant effectiveness. The advantages of labyrinths are their non-wearing and self-venting features.

Some of these commercially successful seal devices do not require any actual physical interengagement of the sealing member parts. Among such devices that have met with considerable commercial acceptance are those disclosed in U.S. Pat. Nos. 4,706,968; 4,466,620; 4,175,752; 4,114,902; 4,022,479; and 4,832,350.

BRIEF DESCRIPTION OF THE DRAWINGS

The accompanying drawings, which are incorporated in and constitute a part of this specification, illustrate embodiments and together with the description, serve to explain the principles of the methods and apparatuses.

DETAILED DESCRIPTION

Figure 2:
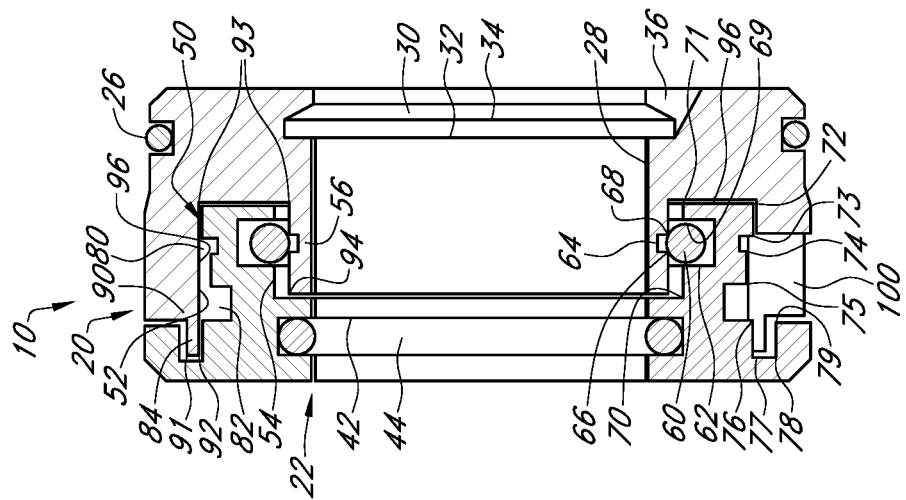
FIG. 2 is a sectional view similar to FIG. 1 showing the seal in further detail.

Before the present methods and apparatuses are disclosed and described, it is to be understood that the methods and apparatuses are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance. Furthermore, any dimensions recited or called out herein are for exemplary purposes only and are not meant to limit the scope of the invention in any way unless so recited in the claims.

ELEMENT LISTING (FIGS. 1-5)

| Description | Element No. |
| --- | --- |
| Bearing isolator | 10 |
| Housing | 12 |
| Shaft | 13 |
| Bearing | 14 |
| Stator | 20 |
| Rotor | 22 |
| Recess | 24 |
| O-ring | 26 |
| Groove | 30 |
| First face | 32 |
| Second face | 34 |
| Drain groove | 36 |
| Restrictive recess | 42 |
| O-ring | 44 |
| Flange | 50 |
| Mating recess | 52 |
| Female surface | 54 |
| Extending surface | 56 |
| Seal member | 60 |
| Recess | 62 |
| Side wall | 63 |
| Groove | 64 |
| Shoulder | 66, 68 |
| Shoulder/Corner | 70-79 |
| Collection groove | 80, 82 |
| Mating projection | 84 |
| Corner | 90-94 |
| Labyrinth passage | 96 |
| Bore | 100 |

The present disclosure relates generally to mechanical equipment shaft sealing devices and more particularly concerns a shaft seal assembly 10 that may effectively seal when a shaft is at rest, and which changes configurations so that it may also seal effectively but without friction when the shaft is rotating at an operating speed.

Certain embodiments of the present disclosure provide an improved static and dynamic seal for use with machinery having a housing through which a rotatable shaft protrudes, and which provide effective part-to-part contact static sealing action when the shaft is stationary, and which provide effective non-contact dynamic sealing action when the shaft is rotating at operating speed.

Certain embodiments of the present disclosure may also provide a machinery seal of the type described in which a solid O-ring seal member engages both a seal stator and a seal rotor when the shaft is at rest, but in which the sealing member expands circumferentially so as to disengage from the stator when the shaft rotates at a normal operating speed.

While the various aspects of the present disclosure will be described in connection with one or more illustrative aspects, it will be understood that it is not intended to limit the scope of the present disclosure unless so indicated in the following claims. On the contrary, it is intended to cover all alternatives, modifications and equivalents as may be included within the spirit and scope of the present disclosure.

Figure 1:
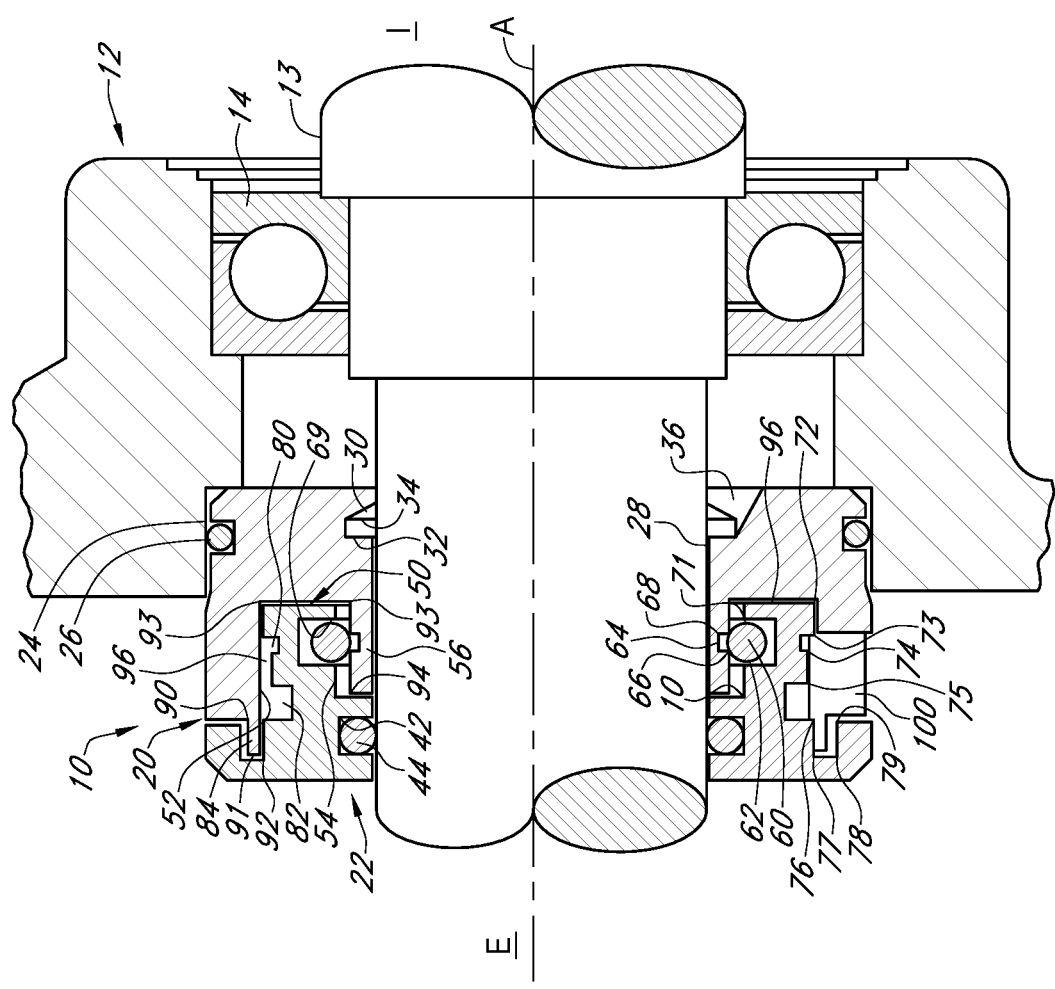
FIG. 1 is a sectional view of a typical machinery housing, bearing, and protruding shaft upon which is mounted a novel seal of the present invention, with the shaft being at rest.

Turning first to FIG. 1, wherein like reference numerals designate similar or corresponding elements throughout the various drawings, there is shown the seal or bearing isolator 10 as it appears when installed on and within a housing 12. A rotatable shaft 13 may protrude through this seal 10 and the housing 12. A bearing 14 may be functionally interposed between the stationary housing 12 and the rotatable shaft 13 in known manner.

Figure 3:
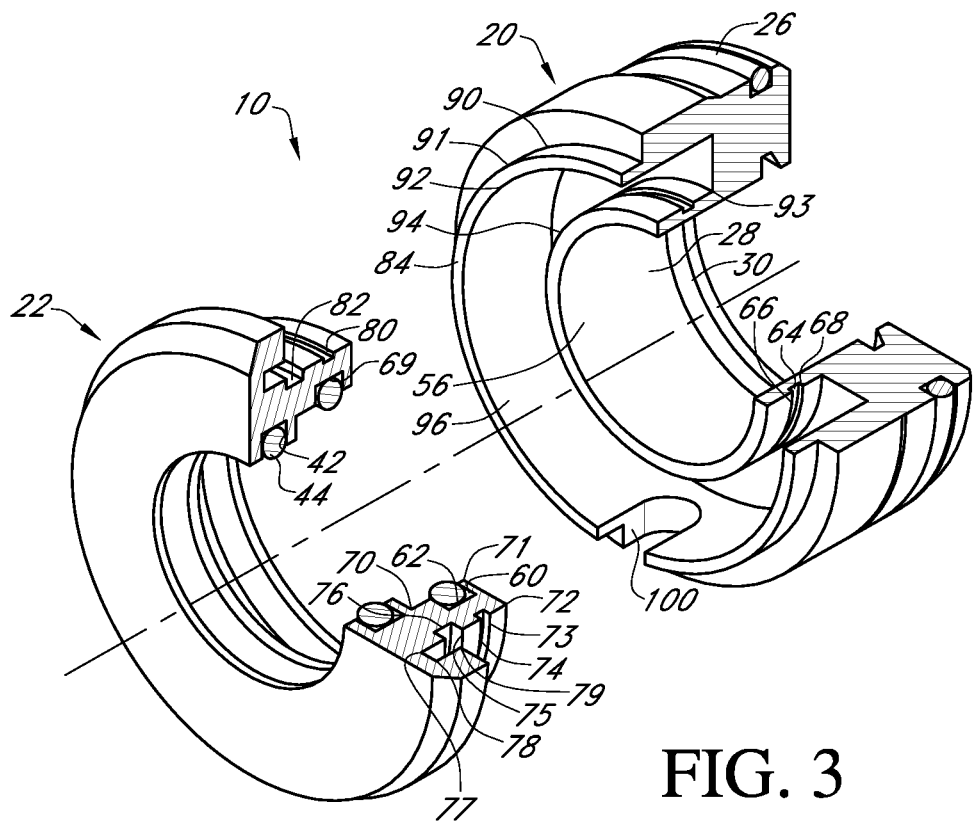
FIG. 3 is an exploded view of the seal of the present invention.

As shown in FIGS. 1, 2, and 3, one illustrative aspect of a seal 10 may comprise, in general, a ring-like stator 20 which may be affixed to the housing 12 and a mating rotor ring 22 which may be secured to the shaft 13 such that the rotor ring 22 follows the rotational motion of the shaft 13. The rotor and stator 20 and 22 can be formed of any suitable material, including but not limited to bronze, steel, other metals and their alloys, synthetic materials such as polymers, and/or combinations thereof.

The stator 20 may be designed and sized to fit securely by means of a light metal-to-metal interference fit within a recess 24 formed in the housing 12. An O-ring seal 26 of known sort may provide an effective and permanent seal between the stator 20 and the housing 12 so as to exclude dust and other contaminants from the outside environment E, and to inhibit or prohibit the leakage of oil or other fluid from the housing inside I. The stator 20 may be secured to the housing 12 in any suitable manner using any suitable structure and/or method, including but not limited to mechanical fasteners, chemical adhesives, and/or combinations thereof. Accordingly, the scope of the present disclosure is in no way limited by the method and/or structure used to engage the stator 20 with a housing 12 unless so indicated in the following claims.

As shown particularly in FIG. 3, the stator 20 may be annular in general shape, but may be formed so that its inner surface 28 is generally cylindrical in shape, and may be sized to provide a modest clearance between that inner surface 28 and the adjacent outer surface of the shaft 13. Thus, the stator 20 may be rigidly affixed to the housing 12 but simultaneously not engage the shaft 13.

To collect lubricating fluids and inhibit their passage down the shaft 13, an annular fluid catchment groove 30 may be formed in the interior of the stator 20. The illustrated groove 30 may be provided with a first or downstream face 32, which downstream face 32 may be oriented generally perpendicularly to the axis A of the shaft 13. The groove 30 may be provided with a second opposed face 34, which may be conical in shape. This configuration of a groove 30 has been found to be effective in collecting oil or other fluids that may flow along the surface of the shaft 13 in a direction leading from the interior I of the housing 12 towards the exterior environment E. A return or drain groove 36 may be located at the bottom of the stator 20, and may be sloped toward the shaft axis such that it collects the accumulated oil or other fluid and encourages its return to the interior bottom of the housing 12.

The rotor 22 may be affixed to and rotate with the shaft 13. To this end, the rotor 22 may be provided with a restrictive recess 42 in which an O-ring 44 may be mounted. The O-ring 44 may be sized and otherwise designed to be moderately compressed within the recess 42 and as to engage the shaft 13 with a modest amount of compressive pressure, which may be accomplished using any suitable manner. The rotor 30 may be secured to the shaft 13 in any suitable manner using any suitable structure and/or method, including but not limited to mechanical fasteners, chemical adhesives, and/or combinations thereof. Accordingly, the scope of the present disclosure is in no way limited by the method and/or structure used to engage the rotor 22 with a shaft 13 unless so indicated in the following claims.

To provide a static seal between the stator 20 and the stationary rotor 22, the rotor 22 may be formed with an axially-extending flange 50, and the stator 20 may be provided with a mating recess 52. At their radially inner portions, the rotor flange 50 may be configured to define an axially-extending, cylindrical female surface 54 and the stator 20 may be configured with a mating, confronting, underlying, axially-extending surface 56. Between these surfaces 54 and 56 may be interposed a solid, yet stretchable O-ring-type seal member 60, which may engage both the stator 20 and the rotor 22 when the shaft 13 and rotor 22 are at rest.

In an illustrative aspect, this stretchable seal member 60 may be disposed in a recess 62 formed in the rotor flange 50, and the seal member 60 may be sized and shaped so as to engage the confronting and adjacent stator male surface 56 and the opposite side walls 63 of recess 62 when the rotor 22 and shaft 13 are not in motion. To improve seal-stator engagement and sealing contact when the seal 10 and rotor 22 are at rest, the stator surface 56 may be interrupted by a groove 64, which may be axially centered relative to the recess 62. This groove 64 may be configured to define two opposed shoulders 66, 68. The shoulders 66, 68 may be configured to engage the resilient seal member 60 along two opposed annular lines of contact when the rotor 22 is not in motion. Thus, positive, physical seal engagement may occur between the seal member 60 and the stator 20 along the two opposed annular shoulders 66, 68; and positive, physical engagement between the seal member 60 and the rotor 22 may occur at all times along annular lines of contact 69 between the seal member 60 and the side walls 63 of the recess 62. A gap may exist between seal member 60 and the bottom wall 65 of recess 62 when the rotor 22 is stationary. The at-rest configuration of the seal parts is shown in FIG. 4.

Figure 5:
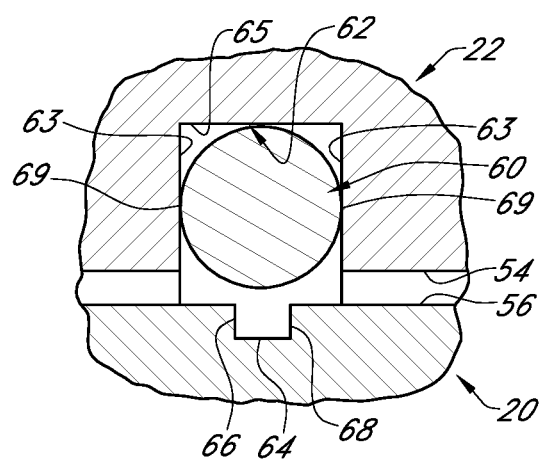
FIG. 5 is an enlarged sectional view similar to FIG. 4 showing the bearing seal parts as they appear when the shaft is rotating at an operating speed.

The solid seal member 60 may centrifugate away from its engagement with the stator 20 when the rotor 22 and shaft 13 are turning at an operating speed, as shown particularly in FIG. 5. Recess 62 may be formed with an excessive radial depth, which may allow seal 60 to expand or stretch circumferentially during rotation, so that the seal member 60 disengages from surface 56 of stator 20. This lift-off or seal member 60 disengagement may occur due to the centrifugal force applied to and/or experienced by the seal member 60, which may cause that seal member 60 to stretch radially as it slides along the walls 63 of the recess 62 and away from the underlying stator male surface 56, as particularly shown in FIG. 5. Under these circumstances, the seal member 60 and corresponding elements of a bearing isolator 10 may be configured so that there is no physical interengagement between any static portion of the bearing isolator 10 and any rotating portion thereof when the shaft 13 is turning at its operating speed. Accordingly, the sealing member 60 may be dynamically effective to inhibit the ingress of contaminants or the egress of fluids, yet simultaneously be frictionless and not wear in operation.

Figure 4:
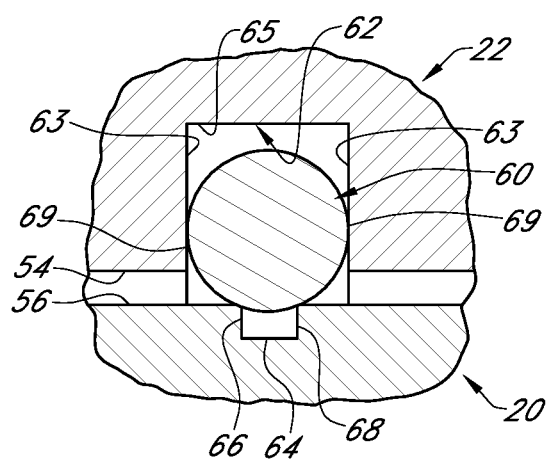
FIG. 4 is an enlarged sectional view showing portions of seal parts as they appear when the shaft is stationary.

As seen in FIGS. 4 and 5, the seal member 60 may have a substantially circular cross section, both at rest and when rotated. When the shaft is at rest, there may be approximately a 0.010 inch space between seal member 60 and the bottom wall 65 of recess 62. The gap allows a 0.010 inch lift-off of the seal member 60 from stator surface 56, with a corresponding 0.020 inch increase in circumference of the seal member 60.

A lubricant, such as grease or the like, may be utilized in groove 64 so as to reduce the friction between the seal member 60 and the stator 20 at the initial rotational startup of shaft 13, before a sufficient operational speed is achieved to produce lift-off of the seal member 60 from the stator 20. The seal member 60 may be a solid toroid formed from a nitrile or flora-elastomer material, such as viton, which is manufactured by Du Pont. The seal member 60 may be formed to have a low durometer hardness, shore A, ranging from 40-70 so that the seal member 60 is resiliently deformable. As will be understood by those skilled in the relevant arts, the seal member 60 may be configured such that it increasingly deforms and lifts away from engagement with the underlying stator 20 as the centrifugal forces increase. These centrifugal forces increase in squared proportion to the linear speed of the moving sealing member 60.

Certain aspects of a bearing isolator 10 may include additional surface formations in the stator recess 52 and mating rotor flange 50, which may serve to inhibit the ingress of contaminants and the egress of fluids, especially when the shaft 13 is rotating. Specifically, the rotor flange 50 may be formed so as to have a series of shoulders or corners 70-79 and annular collection grooves 80, 82. The stator recess 52 likewise may be provided with a mating projection 84 and corners 90-94. These concentric stator 20 and rotor 22 rings may be configured to define an annular, convoluted, labyrinth passage 96 of extended length and various sizes or thicknesses. This path may be, at its thinnest portion, from 0.007 inches to 0.150 inches in radius or thickness.

Consequently, the rotor 22 can spin or rotate within the stator 20 with practically zero friction between the respective surfaces. The labyrinth path 96 may effectively prevent lubricants from passing outwardly from the interior housing I to the exterior E, and also may prevent the ingress of contaminants from the exterior E of the interior I.

A radially inwardly extending bore 100 may be formed at the bottom of the stator 22, which bore 100 may communicate with the collection groove 96. The bore 100 may be configured to lead to the outside E of the machine housing 12, and permit contaminants and other materials that may have collected within the collection groove 96 to expel out of and away from the bearing isolator 10. It will be observed that the manufacture of the stator 20, the rotor 22 and the seal member 60 can be accomplished quickly and easily by known methods. When assembled, the stator 20 and rotor 22 may be configured such that they do not physically engage one another and are interference-free both in configuration and in dynamic operation.

The various aspects of a bearing isolator 10 disclosed herein may be configured to provide an isolator mechanism for use with a machinery housing 12 and a rotatable shaft 13 protruding through the housing 12. The illustrative embodiments may generally comprise a stator 20 configured for engagement with the housing 12 and a rotor 22 configured for engagement with the shaft 13. The stator 20 and rotor 22 may be shaped so that the stator 20 includes a portion configured as a male cylindrical surface, and the rotor 22 may be shaped so that it includes a portion configured as a female cylindrical surface located radially outwardly of the stator male surface. A seal member 60 may be positioned adjacent the rotor female surface and engage the stator male surface when the rotor 22 and seal member 60 are at rest. However, the seal member 60 may be configured such that it is stretched by centrifugal force into a configuration out of engagement with the stator 20 when the rotor 22 and seal member 60 are moving at operating speeds. Other aspects of a bearing isolator 10 may include different combinations of features and/or functionality without departing from the spirit and scope of the present disclosure unless so indicated in the following claims.

ELEMENT LISTING (FIGS. 6-12)

| Description | Element No. |
| --- | --- |
| Shaft seal assembly | 10 |
| Housing | 12 |
| Shaft | 14 |
| O-ring | 18 |
| Skate | 18a |
| Stator | 20 |
| Stator body | 21 |
| Stator O-ring groove | 21a |
| Shoulder | 21b |
| Sealing member groove | 22 |
| Interior drain | 23 |
| Axial projection | 26 |
| External drain | 27 |
| Radial projection | 28 |
| Sloped projection | 28a |
| Axial groove | 29 |
| Radial groove | 29a |
| Rotor | 30 |
| Rotor body | 31 |
| Rotor base | 31a |
| Rotor sealing member groove | 32 |
| First axial interface gap | 34a |
| First radial interface gap | 34b |
| Rotor axial projection | 36 |
| Rotor radial projection | 38 |
| Rotor sloped projection | 38a |
| Rotor axial groove | 39 |
| Rotor radial groove | 39a |
| Ring cavity | 50 |
| Cooperating recess | 51 |
| Radial vertex | 51a |
| Axial vertex | 51b |
| Cooperating ring | 52 |
| Recess seat | 53 |
| Recess ramp | 54 |
| Inflection point | 54a |
| Recess outer surface | 55 |
| Recess lip | 55a |
| Cooperating projection | 56 |
| Radial surface | 56a |
| Angled surface | 56b |
| Axial surface | 56c |
| Terminal surface | 56d |
| Cooperating interface | 57 |

Various illustrative aspects of a shaft seal assembly 10 are shown in FIGS. 6-12, which provide axial, cross-sectional views of four shaft seal assemblies 10. It is contemplated that the illustrative shaft seal assemblies 10 disclosed herein may be specifically adapted for use with mechanical equipment, and may be configured to effectively seal a portion of the equipment both when a shaft 14 is at rest and when the shaft 14 is rotating at an operating speed (which illustrative shaft seal assemblies 10 may achieve without friction). A portion of the shaft seal assembly 10 may change configuration when the shaft 14 is static as opposed to when the shaft 14 is rotating to provide this functionality.

As shown, the shaft seal assembly 10 shown in FIGS. 6-12 may include a stator 20 and a rotor 30. The stator 20 may be configured for engagement with a housing 12, which housing 12 may have a shaft 14 extending therefrom and rotatable with respect thereto. A portion of the stator 20 may extend into the housing 12, and the length of the portion of the stator that extends into the housing 12 may be limited by a shoulder 21b (and/or radial projection 28) that may be formed in a radially exterior surface of the stator 20. A stator 20 may be engaged with a housing 12 via one or more O-rings 18, wherein each O-ring 18 may correspond to a stator O-ring groove 21a, which may be formed in a surface of the stator main body 22 that is adjacent a housing 12 during use. However, the stator 20 may be secured to a housing 12 in any suitable structure and/or method, which include but are not limited to mechanical fasteners, chemical adhesives, welding, interference fit, and/or combinations thereof. Accordingly, the scope of the present disclosure is in no way limited by the method and/or structure used to engage the stator 20 with a housing 12 unless so indicated in the following claims.

The rotor 30 may be configured to engage the shaft 14 in such a manner that the rotor 30 rotates with the shaft 14. In an aspect, the rotor 30 may be engaged with the shaft 14 via one or more O-rings 18, wherein each O-ring 18 may correspond to a rotor O-ring groove 31a. However, any suitable structure and/or method may be used to engage the rotor 30 with the shaft 14, including but not limited to mechanical fasteners, chemical adhesives, welding, interference fit, and/or combinations thereof. Accordingly, the scope of the present disclosure is in no way limited by the method and/or structure used to engage the rotor with a shaft 14 unless so indicated in the following claims.

The stator 20 may be formed with at least one axial projection 26 and/or at least one radial projection 28 extending from a stator body 21, and/or it may be configured with one or more axial and/or radial grooves 29, 29a. An axial and/or radial groove 29, 29a may be formed in the stator body 21, an axial projection 26, and/or a radial projection 28. Each groove 29, 29a may extend around the entire feature on which the groove 29, 29a is formed, such that the groove 29, 29a is an annular groove. Similarly, each projection 26, 28 may extend around the entire stator 20 such that it is an annular projection 26, 28. Additionally, an axial and/or radial projection 26, 28 may extend from the stator body 21, an axial projection 26, a radial projection 28, an axial groove 29, and/or a radial groove 29a. As is evident from the various figures, projections 26, 28 may cooperate to from grooves 29, 29a and vice versa.

In a similar manner, the rotor 30 may be formed with at least one rotor axial projection 36 and/or at least one rotor radial projection 38 extending from a rotor body 31, and/or it may be configured with one or more rotor axial and/or radial grooves 39, 39a. A rotor axial and/or radial groove 39, 39a may be formed in the rotor body 31, a rotor axial projection 36, and/or a rotor radial projection 38. Each rotor groove 39, 39a may extend around the entire feature on which the rotor groove 39, 39a is formed, such that the rotor groove 39, 39a is an annular groove. Similarly, each rotor projection 36, 38 may extend around the entire rotor 30 such that it is an annular rotor projection 36, 38. Additionally, a rotor axial and/or radial projection 36, 38 may extend from the rotor body 31, a rotor axial projection 36, a rotor radial projection 38, a rotor axial groove 39, and/or a rotor radial groove 39a. As is evident from the various figures, rotor projections 36, 38 may cooperate to form rotor grooves 39, 39a and vice versa.

The stator 20 and rotor 30 may be configured such that at least one projection 26, 28 in the stator 20 corresponds to at least one rotor groove 39, 39a and/or such that at least one rotor projection 36, 38 corresponds to at least one groove 29, 29a formed in the stator 20. In this way, the stator 20 and rotor 30 may be configured such that the various grooves 29, 29a and/or projections 26, 28 of the stator 20 cooperate with various rotor grooves 39, 39a and/or rotor projections 36, 38 to form a labyrinth seal and/or passage between the stator 20 and rotor 30. It is contemplated that a labyrinth passage between the stator 20 and rotor 30 may serve to mitigate/prevent egress of lubricant from the housing 12 through the shaft seal assembly 10 while simultaneously serving to mitigate/prevent ingress of contaminants from the external environment through the shaft seal assembly 10 to the housing 12.

The shaft seal assemblies 10 shown in FIGS. 6-12 may be configured to provide at least the various benefits associated with the embodiments of a bearing isolator 10 shown in FIGS. 1-5, and such that the shaft seal assembly 10 operates in a manner similar to that of the bearing isolator shown in FIGS. 1-5. However, the various elements, functionality, descriptions, etc. of any bearing isolator 10 disclosed herein in no way limits the scope of any shaft seal assembly 10 and vice versa.

Generally, whereas a ring cavity 50 (that is, the portion of the bearing isolator 10 configured to accommodate the seal member 60) in the bearing isolator 10 shown in FIGS. 1-5 includes surfaces that are either parallel to or perpendicular to the rotational axis of the shaft 14 (and more specifically two surfaces that are perpendicular and one surface that is parallel thereto), the embodiments of a shaft seal assembly 10 shown in FIGS. 6-12 may include a ring cavity 50 with at least some surfaces that generally may be oriented other than perpendicular to or perpendicular with respect to the rotational axis of the shaft 14, and which ring cavity 50 may have more than three surfaces as described in detail below.

As shown in FIGS. 6-9A and 10A-11C, a shaft seal assembly 10 may be formed with a ring cavity 50 therein, a portion of which ring cavity 50 may be occupied by a cooperating ring 52 during use. It is contemplated that in an aspect of the shaft seal assembly 10, the cooperating ring 52 may be formed and/or configured in a manner that is substantially similar to that of the seal member 60 as previously described herein for a bearing isolator 10 shown in FIGS. 1-5. That is, the cooperating ring 52 may be formed of a solid, yet stretchable material, such that the cooperating ring 52 may expand radially outward when subjected to a predetermined amount of centrifugal force. The cooperating ring 52 may be configured to physically engage the stator 20 and/or rotor 30 at one or more surfaces 56b, 56c (which may be formed as generally radially inward surfaces formed in the stator 20 and/or rotor 30) of the ring cavity 50 when the shaft 14 (and consequently the rotor 30 and cooperating ring 52) is at rest with respect to the housing 12 and stator 20.

When the shaft 14 (and consequently, the rotor 30) begin to rotate at a predetermined speed, the centrifugal force therefrom may cause the cooperating ring 52 to be stretched by that centrifugal force such that the cooperating ring 52 disengages one or more surfaces 56b, 56c. The cooperating ring 52 may be configured such that it expands radially (due to this centrifugal force) until it engages a recess ramp 54 and/or recess outer surface 55, recess ramp 54 and recess outer surface 55 are shown formed in the rotor 30 in the shaft seal assembly 10 in FIGS. 6-12. However, the recess ramp 54 and/or recess outer surface 55 may be differently configured without limitation unless so indicated in the following claims.

Figure 6:
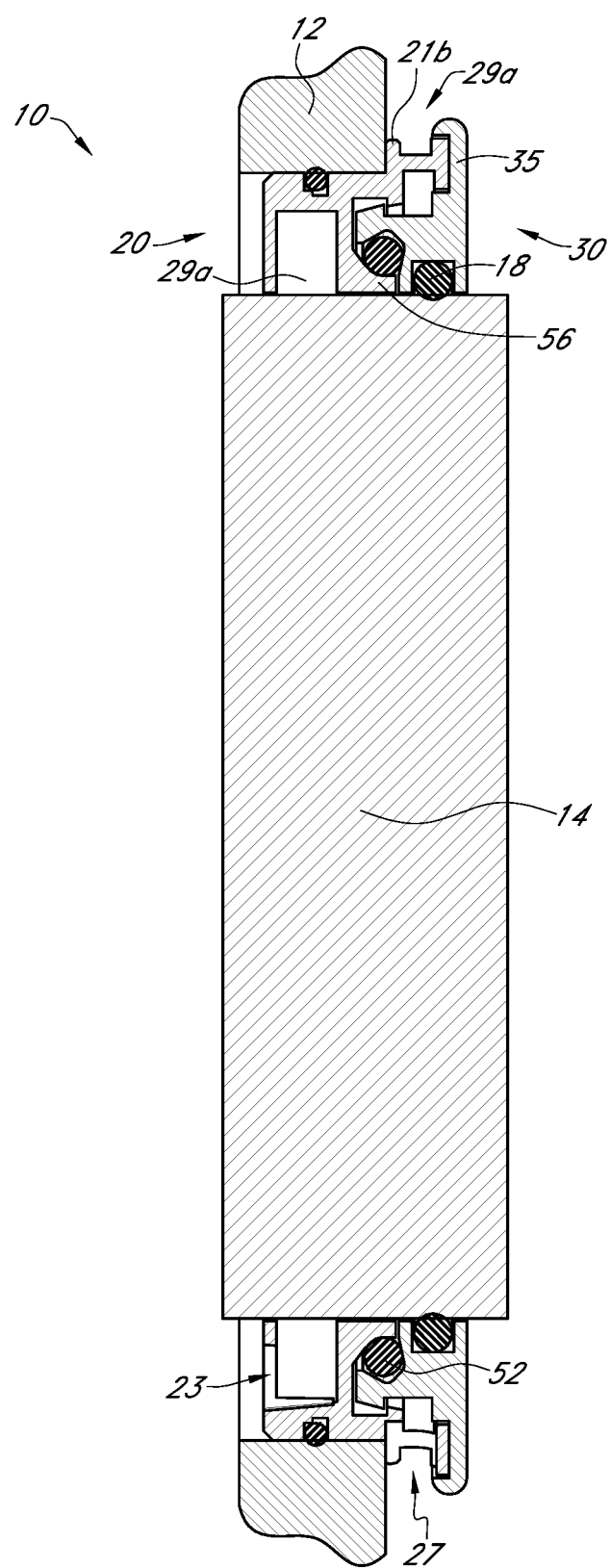
FIG. 6 is an axial, cross-sectional view showing various aspects of a shaft seal assembly.
Figure 6A:
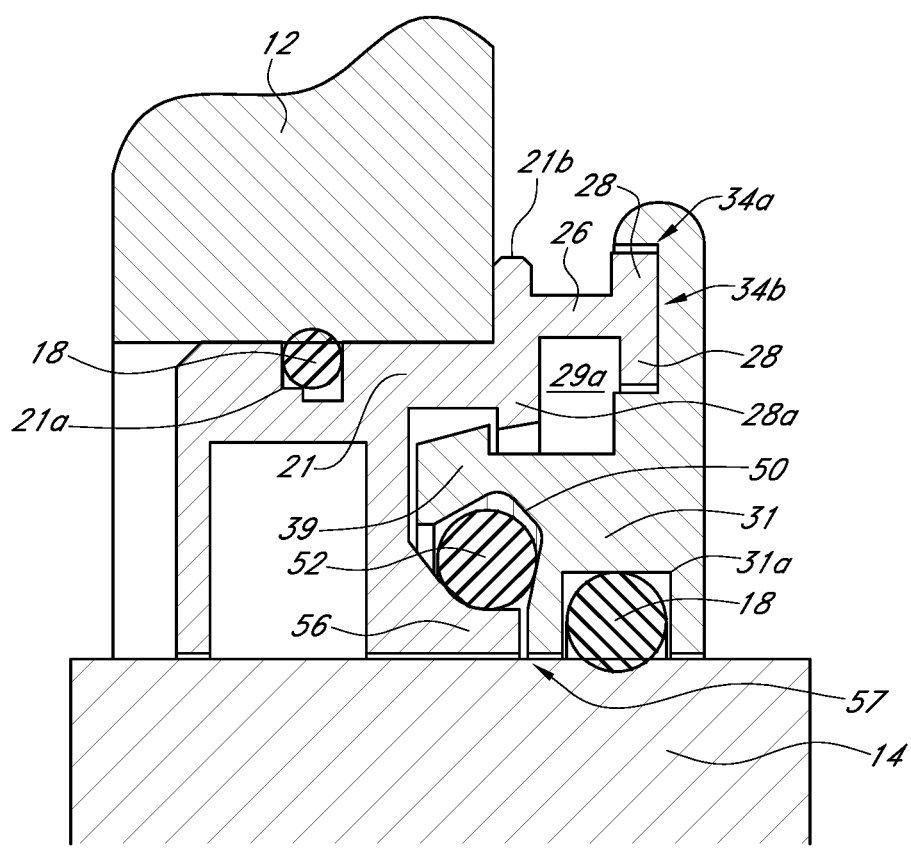
FIG. 6A is a detailed view of a top portion of FIG. 6.
Figure 7:
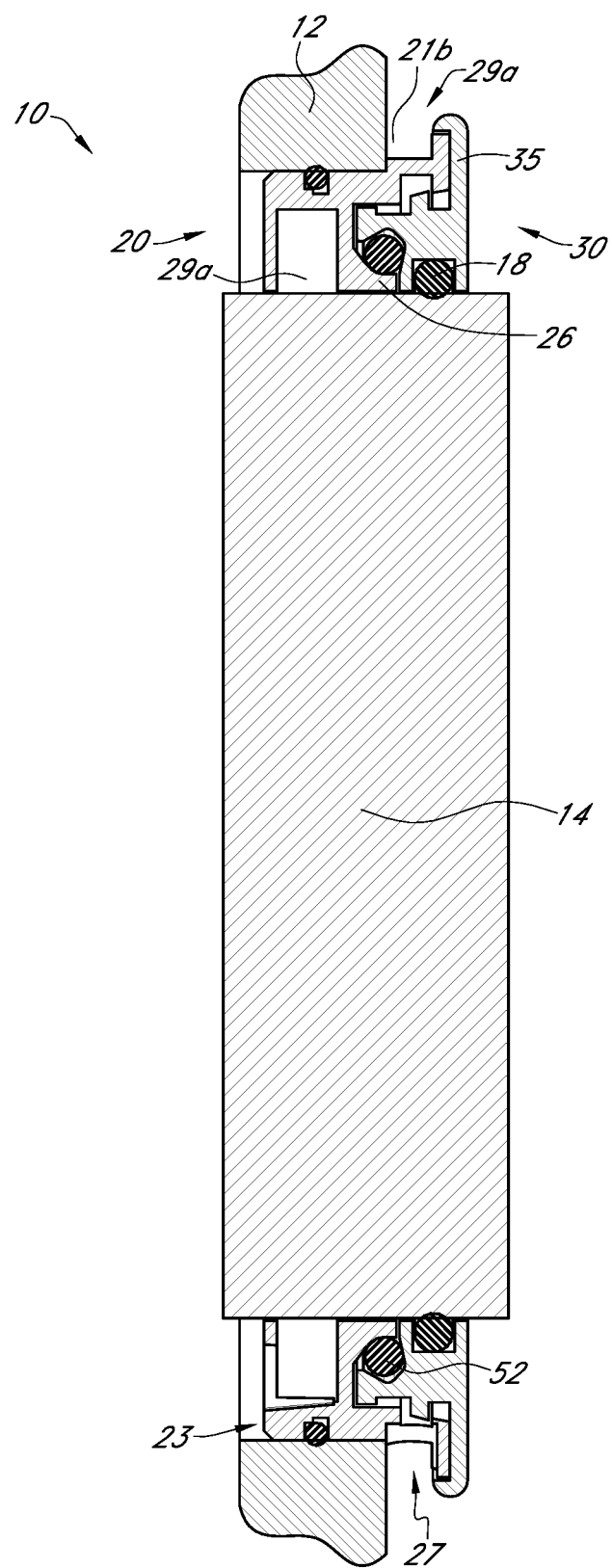
FIG. 7 is an axial, cross-sectional view showing other aspects of a shaft seal assembly.
Figure 7A:
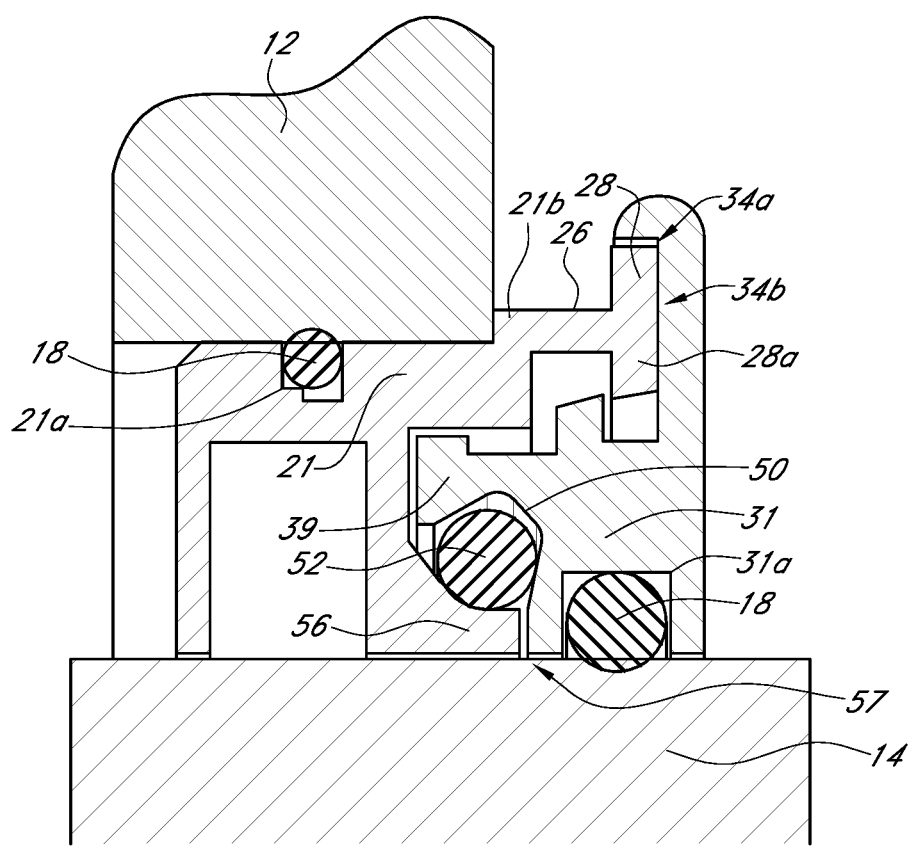
FIG. 7A is a detailed view of a top portion of FIG. 7.

Referring generally to FIGS. 10A-11C, which provide various axial cross-sectional views of a shaft seal assembly 10 also shown in FIGS. 6 and 6A, the rotor 30 and stator 20 may be configured to form a ring cavity 50 therebetween. In conjunction with a cooperating recess 51 formed in a portion of the rotor 30, a cooperating projection 56 formed in a portion of the stator 20 may provide various boundaries of a ring cavity 50. A detailed, cross-sectional view of a top portion of a stator 20 is shown in FIG. 11A and a corresponding view of a rotor 30 is shown in FIG. 11B. Both the stator 20 and the rotor 30 are shown together in FIG. 11C.

Figure 11B:
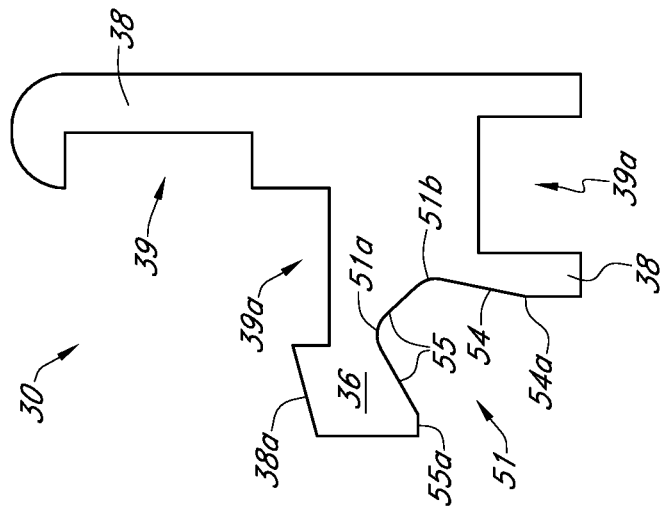
FIG. 11B is another axial, cross-sectional view of the top portion of the rotor in FIG. 10B.
Figure 11A:
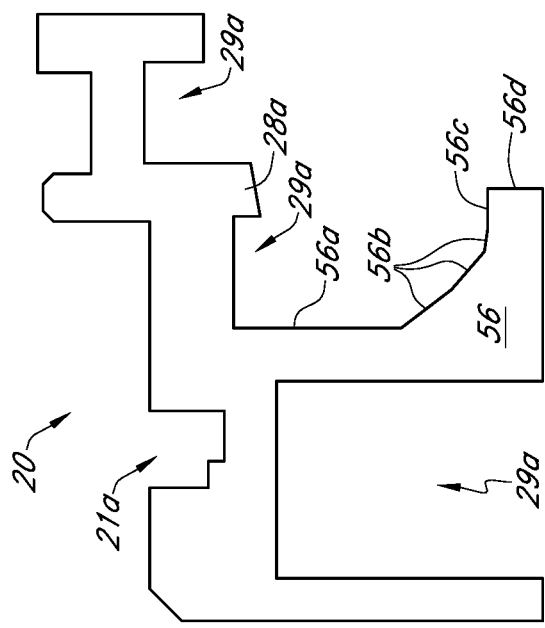
FIG. 11A is another axial, cross-sectional view of the top portion of the stator in FIG. 10A.
Figure 11C:
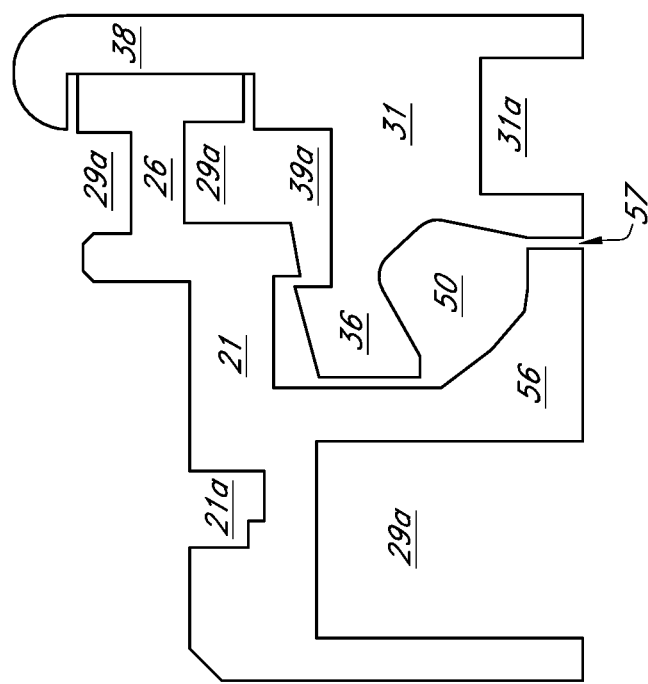
FIG. 11C is an axial, cross-sectional view of the top portion of the stator from FIG. 11A and the top portion of the rotor from FIG. 11B positioned adjacent one another.

Referring generally to FIG. 11A, in an aspect, a cooperating projection 56 may define a radial surface 56a, an angled surface 56b, and an axial surface 56c. As shown, the stator 20 may include three distinct angled surfaces 56b, wherein a first angled surface 56b is positioned adjacent the radial surface 56a, a third angled surface 56b is positioned adjacent the axial surface 56c, and a second angled surface 56b is positioned between the first and third angled surfaces 56b. In an aspect, the three angled surfaces 56b may be configured to provide a gradual, relatively smooth transition from the radial surface 56a to the axial surface 56c, wherein the first angled surface 56b is angled with respect to the radial surface 56a may a relatively slight amount, the second angled surface 56b is angled with respect to the radial surface 56a by a relatively greater amount, and the third angled surface 56b is angled with respect to the radial surface 56a by a relatively large amount (and vice versa with respect to the axial surface 56c). Additionally, the various transitions from a radial surface 56a to an angled surface 56b, from an angled surface 56b to an angled surface 56b, and from an angled surface to an axial surface 56c may be smooth and/or radiused. It is contemplated that this gradual, relatively smooth transition from the radial surface 56a to the axial surface 56c may aide in proper placement of the cooperating ring 52 when the shaft 14 is at rest, as described further below.

The cooperating projection 56 may end at a terminal surface 56d. In an aspect, the terminal surface 56d may be radially oriented such that it may be generally perpendicular to the axial surface 56c. However, the terminal surface 56d may be differently configured in other aspects of the shaft seal assembly 10 without limitation unless so indicated in the following claims. In an aspect, when the shaft 14 is at rest, at least a portion of the cooperating ring 52 may engage at least one angled surface 56b and/or the axial surface 56c formed in the stator 20 and simultaneously engage at least a recess ramp 54 and/or a generally axially interior surface of a rotor radial projection 38. In this manner, the cooperating ring 52 may prevent contaminants within the ring cavity 50 from moving past the cooperating ring 52 toward the shaft 14 through a cooperating interface 57 positioned between the terminal surface 56d and a generally axially interior surface of the rotor 30.

In other aspects, the cooperating projection 56 may have more or fewer surfaces 56a, 56b, 56c, and/or multiple radial surfaces 56a, angled surfaces 56b, and/or axial surfaces 56c, and/or may have multiple angled surfaces 56c differently configured without limitation unless so indicated in the following claims. A portion of the radial surface 56a may be positioned adjacent a portion of the rotor 30 during use. In an aspect, the portion of the rotor 30 adjacent the radial surface 56a may be a rotor projection 36, 38, 38a, which may be formed with a radially oriented surface thereon to compliment the radial surface 56a as shown at least in FIGS. 11A-11C. However, other configurations of an interface between any feature of the rotor 30 and any feature of a cooperating projection 56 may be used without limitation unless so indicated in the following claims. Together, the cooperating recess 51 and cooperating projection 56 may form all or a portion of the ring cavity 50 as described in further detail below.

Referring generally to FIG. 11B, in an aspect a cooperating recess 51 may be formed generally in a rotor axial projection 36. The cooperating recess may be formed with a radial vertex 51a at its radially outward extreme, wherein the radial vertex 51a may be configured as a relatively smooth curve. However, in other aspects the radial vertex 51a may be differently configured without limitation unless so indicated in the following claims. The rotor 30 may be formed with one or more radial bores (not shown) extending from a portion of the cooperating recess 51 radially outward through a rotor axial projection 36 to provide a pathway in the radial direction from the ring cavity 50 to a generally radially exterior interface between the rotor 30 and the stator 20.

A recess outer surface 55 may be formed on either side of the radial vertex 51a, and each recess outer surface may extend away from the radial vertex 51a in a direction that is angled with respect to the axis of rotation of the shaft 14 and a plane that is perpendicular to that axis, wherein a component of the direction may be generally radially inward (i.e., toward the shaft 14). In an aspect, the angle of the recess outer surfaces 55 with respect to the axis of rotation of the shaft 14 may be between 5 and 90 degrees, and one recess outer surface 55 may be differently angled than the other without limitation unless so indicated in the following claims. In an aspect, one recess outer surface 55 may extend from the radial vertex 51a in a generally radially and axially inward direction (e.g., the recess outer surface 55 on the left-hand side of FIGS. 6-12) and another recess outer surface 55 may extend from the radial vertex 51a in a generally radially inward and axially outward direction (e.g., the recess outer surface 55 on the right-hand side of FIGS. 6-12). Again, other configurations of recess outer surfaces 55 may be used without limitation unless so indicated in the following claims.

Still generally referring to FIG. 11B, in an aspect a cooperating recess 51 may be formed with an axial vertex 51b, such that at least one recess outer surface 55 may be defined on a first end thereof by a radial vertex 51a and on a second end thereof by an axial vertex 51b. The axial vertex 51b may be configured as a relatively smooth curve. However, in other aspects the axial vertex 51b may be differently configured without limitation unless so indicated in the following claims. Another recess outer surface 55 may be defined on a first end thereof by the radial vertex 51a and on a second end thereof by a recess lip 55a. The recess lip 55a may be angled with respect to the recess outer surface 55 such that the angle between the recess outer surface 55 and the rotational axis of the shaft 14 is greater than that between the recess lip 55a and the rotational axis of the shaft 14. However, in other aspects the recess lip 55a may be differently configured without limitation unless so indicated in the following claims.

As previously described with respect to a radial surface 56a, a portion of the rotor 30 may be positioned adjacent the radial surface 56a. In an aspect, the portion of the rotor 30 adjacent the radial surface 56a may a generally axially interior surface of a rotor axial projection 36, which generally axially interior surface may be parallel with respect to the radial surface 56a and other surfaces of which may form portions of the cooperating recess 51. However, as explained above, the radial surface 56a is not limited such that it must be perpendicular with respect to the rotational axis of the shaft 14, and consequently, neither is the surface of the rotor 30 adjacent the radial surface 56a so limited, unless so indicated in the following claims. In an aspect wherein the radial surface 56a is not perpendicular to the rotational axis of the shaft 14, the surface of the rotor 30 adjacent the radial surface 56a may be similarly angled, such that it may be parallel to the radial surface 56a. However, other configurations of an interface between any feature of the rotor 30 and any feature of a cooperating projection 56 may be used without limitation unless so indicated in the following claims.

In an aspect, a recess ramp 54 may extend from an axial vertex 51b, and may to so in a generally radially inward and axially inward direction. The recess ramp 54 may be angled with respect to the radial of the shaft 14 by an amount between 3 and 70 degrees. In an aspect, the recess ramp 54 and the recess outer surface 55 that does not terminate at the axial vertex 51b may be parallel with respect to one another. However, the specific configuration of the recess ramp 54, vertices 51a, 51b, and/or outer recess surfaces 55 in no way limits the scope of the present disclosure unless so indicated in the following claims.

The recess ramp 54 may be defined on a first end thereof by an axial vertex 51b and on a second end thereof by an inflection point 54a. From the inflection point 54a, a rotor radial projection 38 may extend in a generally radially inward direction. An axially interior surface of this rotor radial projection 38 may be configured such that it is generally parallel with respect to the radius of the shaft 14. As the shaft 14 (and consequently, the rotor 30) begin to rotate, the recess ramp 54 and/or a rotor radial projection 38 may contact the cooperating ring 52, thereby imparting rotational energy thereto, which may cause the cooperating ring 52 to rotate. The centrifugal force of the rotation of the cooperating ring 52 may cause the cooperating ring 52 to extend radially outward such that a portion thereof moves in direction from an area on the recess ramp 54 adjacent the inflection point 54a toward the axial vertex 51b, and from the axial vertex 51b toward the radial vertex 51a. In an aspect, a portion of the cooperating ring 52 may seat within the radial vertex 51a when the shaft 14 is at an operational speed. Further, the cooperating ring 52 and ring cavity 50 may be configured such that when the shaft 14 is at an operation speed, no portion of the cooperating ring 52 is in physical contact with the stator 20. The various surfaces 56a, 56b, 56c in the cooperating projection 56 may be configured such that in the event that the cooperating ring 52 contacts one of those surfaces 56a, 56b, 56c when the shaft 14 is rotating, those surfaces 56a, 56b, 56c may serve to urge the cooperating ring 52 toward the rotor 30 such that any contact between the stator 20 and the cooperating ring 52 when the shaft 14 is rotating may be nominal.

Figure 12:
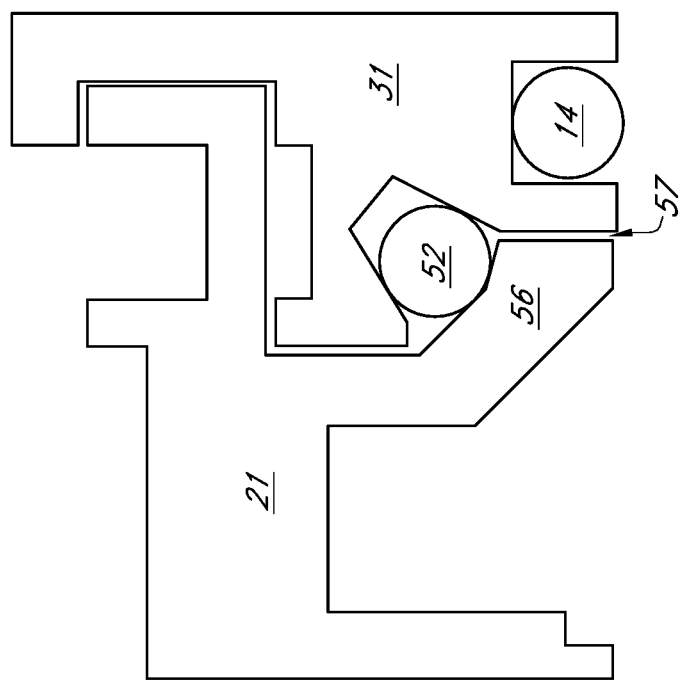
FIG. 12 is an axial, cross-sectional view of a top portion of a shaft seal assembly.

Referring now generally to FIG. 12, in an aspect the recess ramp 54 may be configured such that it is not parallel with respect to the opposed recess outer surface 55 (that is, the recess outer surface 55 that is not positioned between the radial vertex 51a and axial vertex 51b). More specifically, the recess ramp 54 and the opposed recess outer surface 55 may be configured such that the cooperating ring 52 may be compressed between the recess ramp 54 and a portion of the opposed recess outer surface 55 as the cooperating ring 52 is urged toward the radial vertex 51a due to the centrifugal force from the rotation of the shaft 14 (and consequently, the rotor 30). Still generally referring to FIG. 12, the two recess outer surfaces 55 may be at an angle greater than 90 degrees with respect to one another, as may the recess outer surface 55 adjacent the recess ramp 54 and the recess ramp 54. Further, the length of the recess outer surface 55 between the radial vertex 51a and axial vertex 51b may be less than that of the recess outer surface 55 that is opposed to the recess ramp 54. Of course, other configurations of the various surfaces of the ring cavity 50 may be implemented without departing from the spirit and scope of the present disclosure.

Still generally referring to FIG. 12 (in conjunction with FIGS. 11A-11C), the cooperating projection 56 may be configured such that an axial surface 56c is not required. As shown in FIG. 12, the cooperating projection 56 may be configured such that an angled surface 56b is positioned adjacent a terminal surface 56d. Accordingly, the scope of the present disclosure is not limited to shaft seal assemblies 10 having an axial surface 56c unless so indicated in the following claims.

Referring now generally to FIGS. 11A-12, the stator 20 and the rotor 30 may be configured such that the inflection point 54a formed in the rotor 30 may be at approximately the same radial distance from the rotational axis of the shaft 14 as the transition between the terminal surface 56d and the axial surface 56c or angled surface 56b. However, other configurations may be used without limitation unless so indicated in the following claims.

Referring now generally to FIGS. 6, 6A, 7, 7A, 8, and 8A the shaft seal assembly 10 may be configured such that the stator 20 includes a sloped projection 28a and the rotor 30 includes a rotor sloped projection 38a. The sloped projection 28a and the rotor sloped projection 38a may be configured to cooperate with one another to provide a snap-together functionality between the stator 20 and the rotor 30, which functionality is described in detail in U.S. Pat. No. 7,052,014 and will not be discussed further herein for purposes of brevity.

Figure 8:
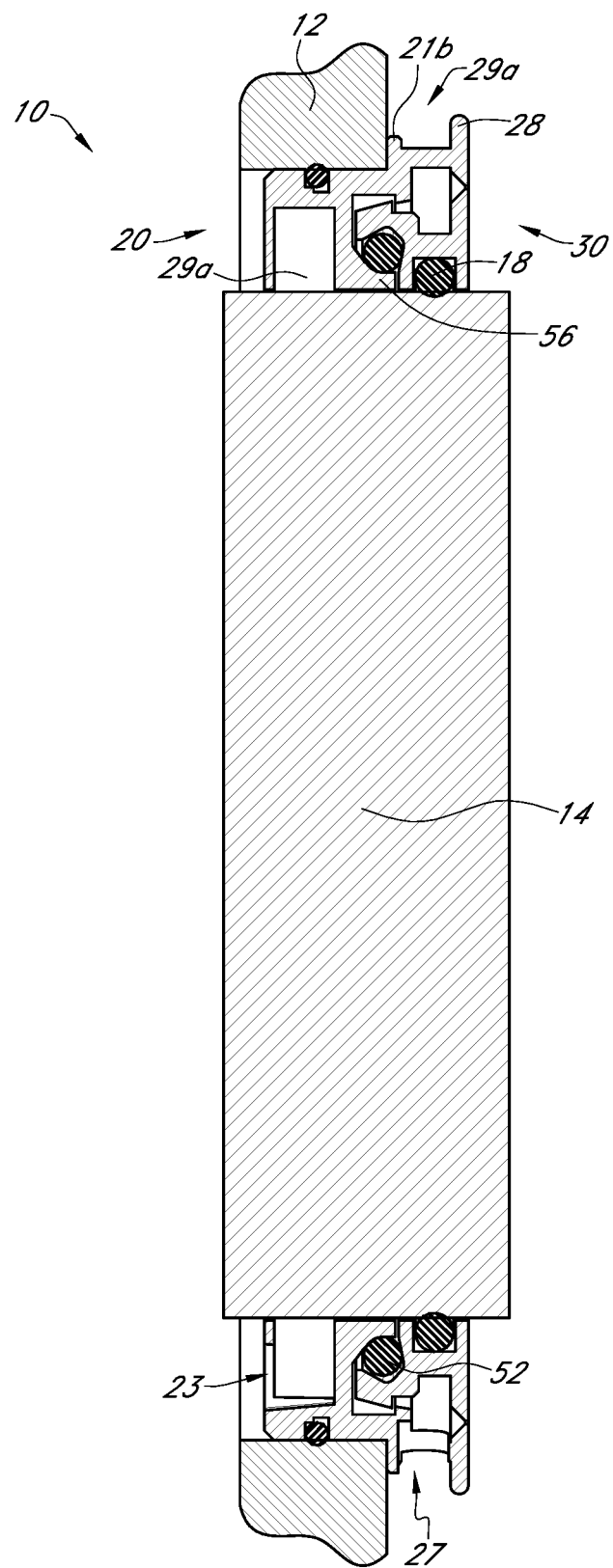
FIG. 8 is an axial, cross-sectional view showing further aspects of a shaft seal assembly.
Figure 8A:
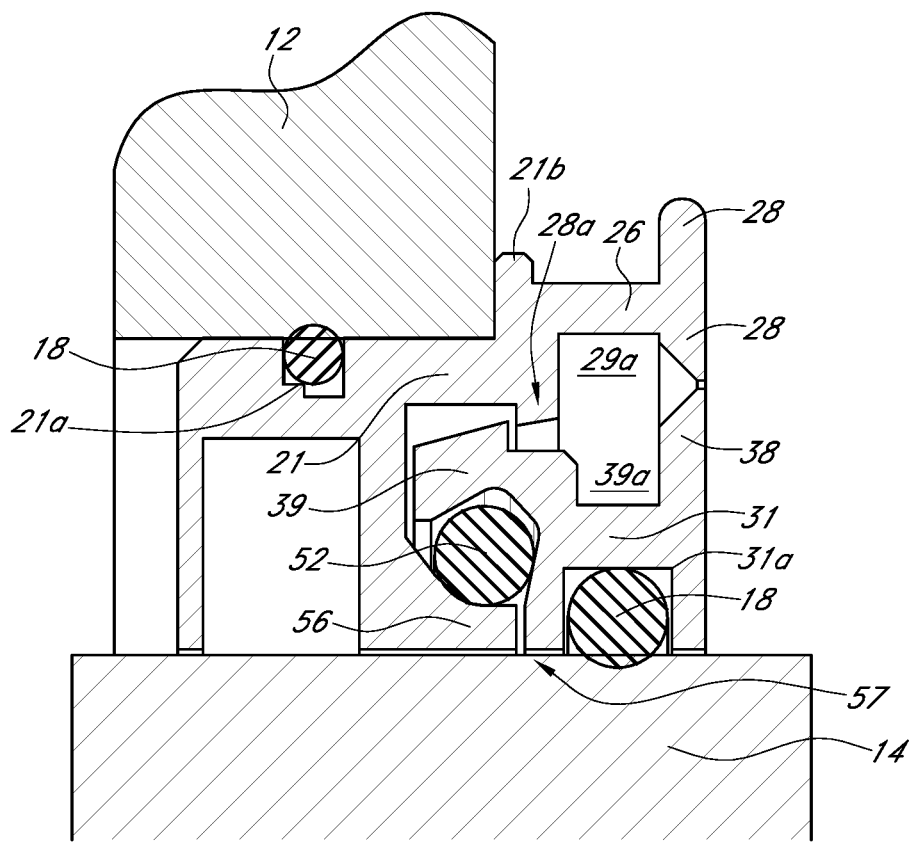
FIG. 8A is a detailed view of a top portion of FIG. 8.

Referring now generally to FIGS. 8 and 8A, the shaft seal assembly 10 may be configured such that a first external interface between the stator 20 and the rotor 30 is located along a generally radially oriented plane at a radial projection 28 and a rotor radial projection 38, wherein both the radial projection 28 and rotor radial projection 38 may have an exterior surface thereon (e.g., the surface to the right in FIGS. 8 and 8A). Moving in a generally axially inward direction from the interface (i.e., from right to left per the orientation shown in FIGS. 8 and 8A), the distance between the radial projection 28 and the rotor radial projection 38 may increase. That is, the radial dimension of the first external interface between the stator 20 and the rotor 30 may increase in a generally axially inward direction. Accordingly, any material located within a radial groove 29a and/or rotor radial groove 39a adjacent this interface may be subjected to a type of funnel from the interior of the shaft seal assembly 10 to the exterior thereof, easing egress of contaminants from the interior of the shaft seal assembly 10 to the exterior thereof. Furthermore, if a contaminant (e.g., water) is sprayed toward the exterior of the shaft seal assembly 10 adjacent this interface, the interface opens from the exterior to the interior such that it may cause the contaminant spray to spread out in a fan-like pattern, which may frustrate ingress of the contaminant into the shaft seal assembly 10.

Figure 9:
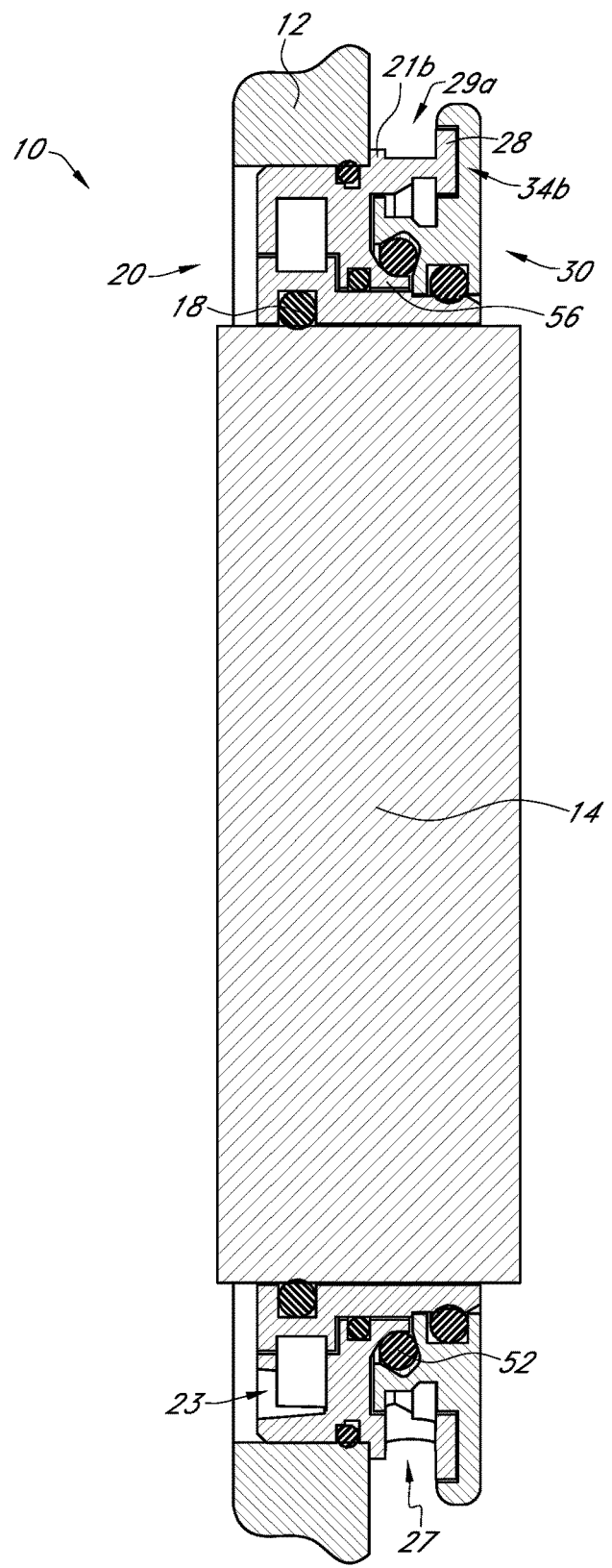
FIG. 9 is an axial, cross-sectional view showing additional aspects of a shaft seal assembly.
Figure 9A:
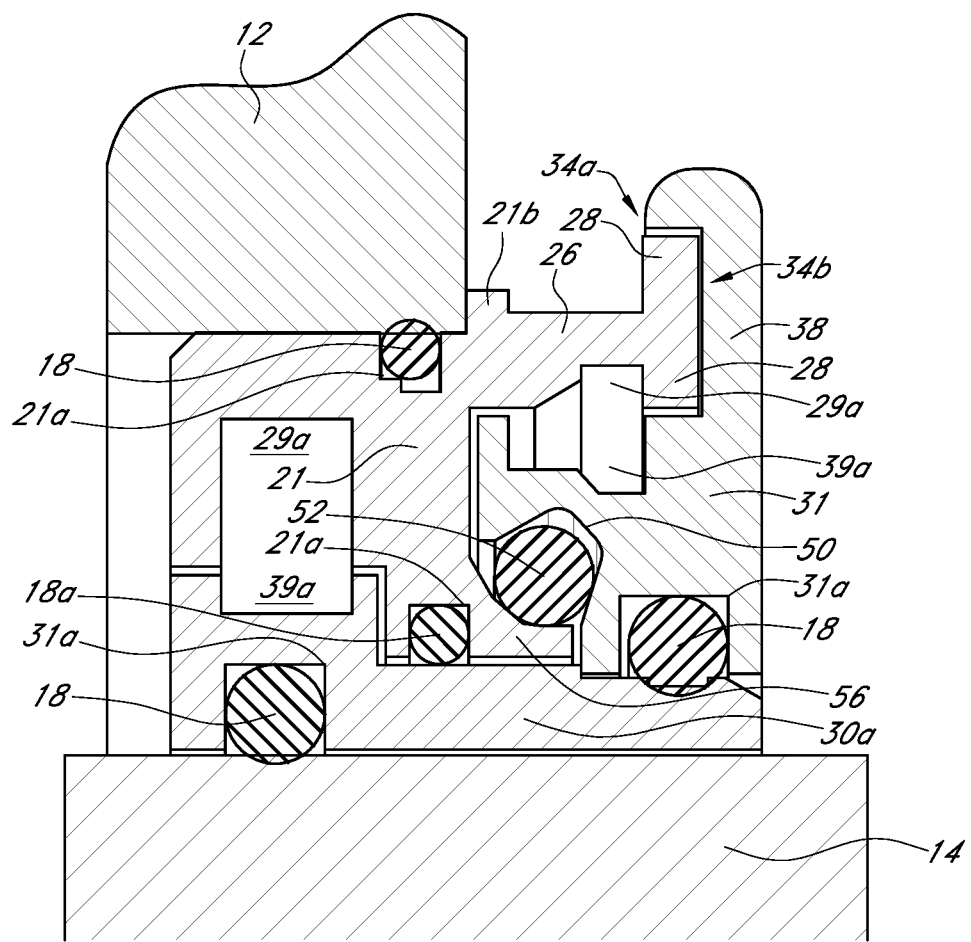
FIG. 9A is a detailed view of a top portion of FIG. 9.
Figure 10:
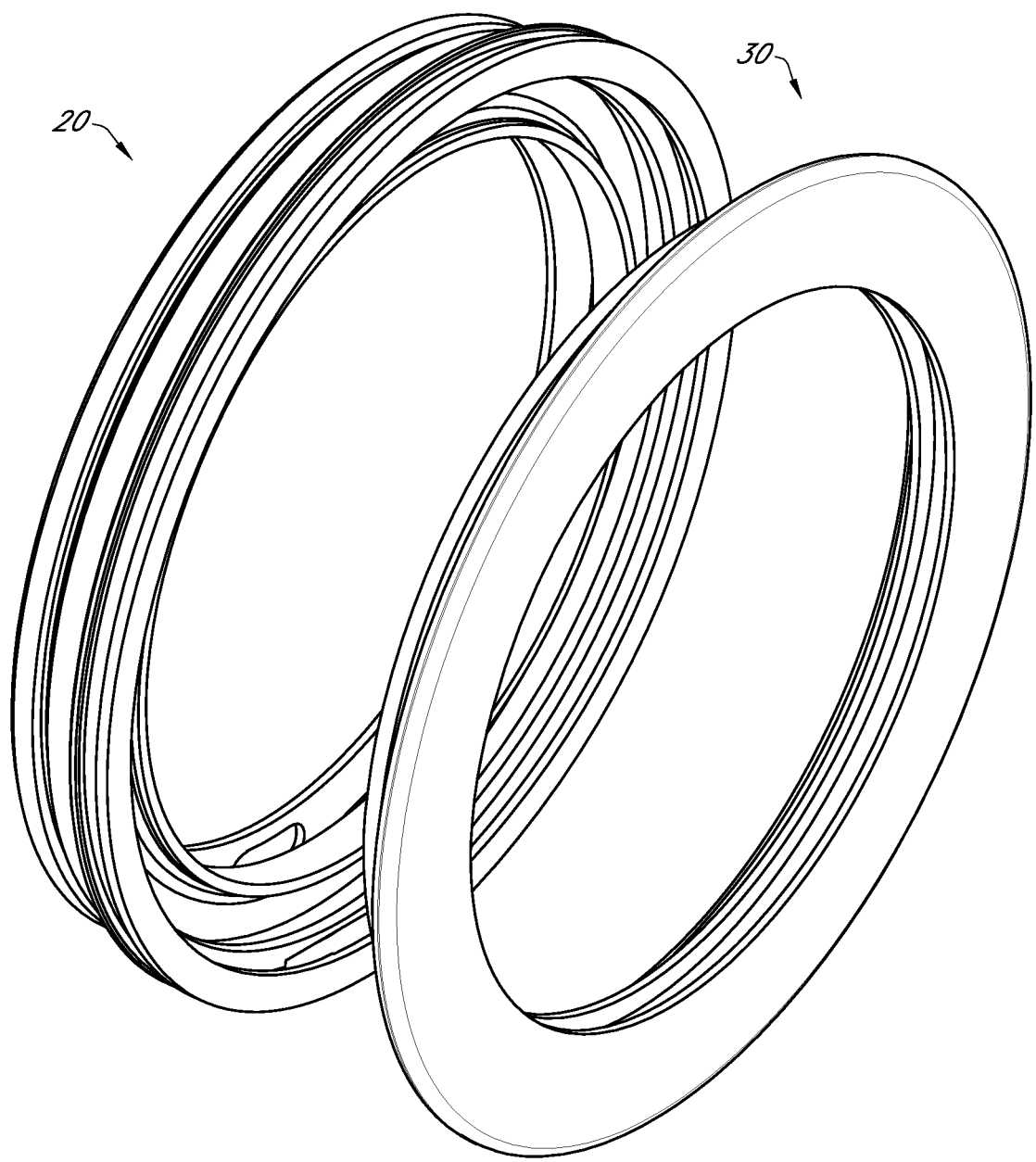
FIG. 10 is an exploded, perspective view of the shaft seal assembly shown in FIG. 6.
Figure 10B:
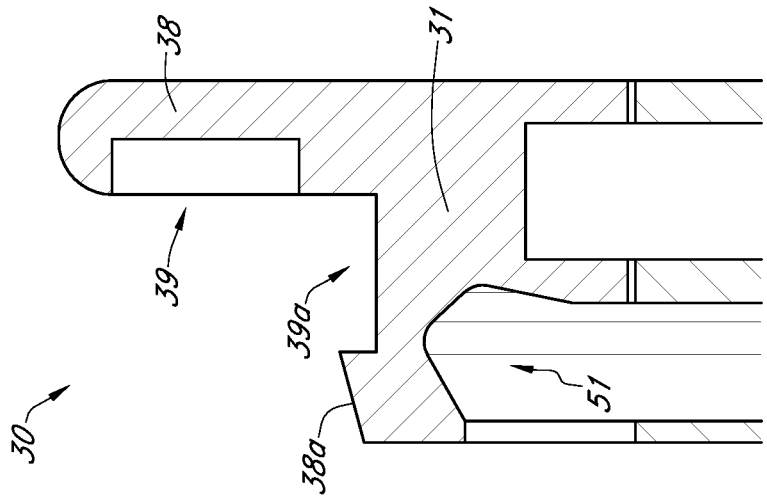
FIG. 10B is an axial, cross-sectional view of a top portion of the rotor from the shaft seal assembly shown in FIGS. 7, 7A, and 10.
Figure 10A:
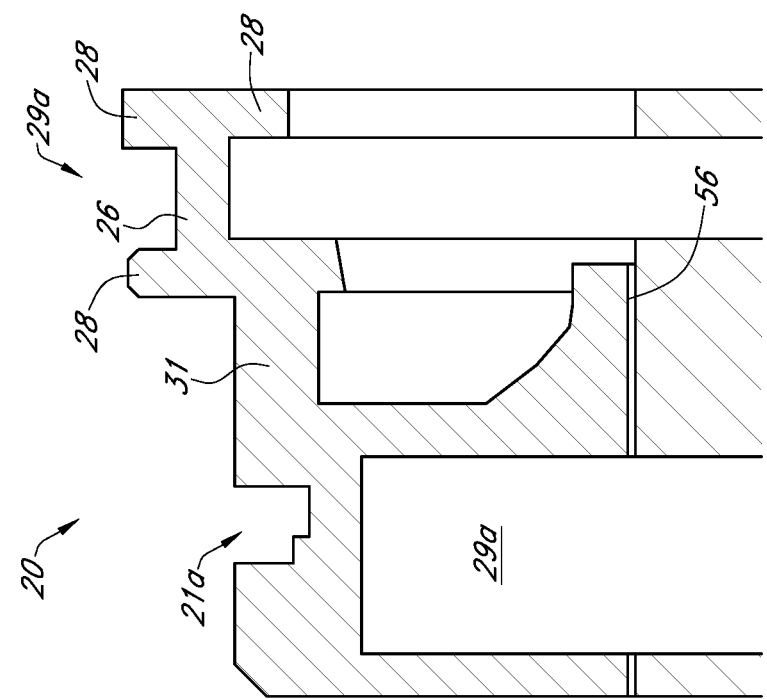
FIG. 10A is an axial, cross-sectional view of a top portion of the stator from the shaft seal assembly shown in FIGS. 7, 7A, and 10.

Referring now generally to FIGS. 9 and 9A, the shaft seal assembly may be configured such that the rotor 30 thereof may be formed of two distinct portions comprising a rotor base 30a and a rotor body 31. In an aspect, the stator 20 and rotor 30 may be unitized so as to mitigate and/or eliminate separation of the rotor 30 from the stator 20 upon axial movement of the stator 20 and/or rotor 30 relative to the shaft 14 and/or housing 12.

The rotor base 30a may be configured to engage the shaft 14 in such a manner that the rotor base 30a rotates with the shaft 14. The rotor body 31 may be configured to engage the rotor base 30a in such a manner that the rotor body 31 rotates with the rotor base 30a. In an aspect, the rotor base 30a may be engaged with the shaft 14 via one or more O-rings 18, wherein each O-ring 18 may correspond to a rotor O-ring groove 31a formed in the rotor base 30a. The rotor body 31 may be engaged with the rotor base 30a via one or more O-rings 18, wherein each O-ring 18 may correspond to a rotor O-ring groove 31a formed in the rotor base 30a and/or rotor body 31. However, any suitable structure and/or method may be used to engage the rotor base 30a with the shaft 14 and/or to engage the rotor base 30a with the rotor body 31, including but not limited to mechanical fasteners, chemical adhesives, welding, interference fit, and/or combinations thereof. Accordingly, the scope of the present disclosure is in no way limited by the method and/or structure used to engage the rotor base 30a with a shaft 14 and/or used to engage the rotor base 30a with the rotor body 31 unless so indicated in the following claims.

The rotor base 30a may be formed with at least one rotor axial projection 36 and/or at least one rotor radial projection 38 extending from the rotor base 30a, and/or it may be configured with one or more rotor axial and/or radial grooves 39, 39a. A rotor axial and/or radial groove 39, 39a may be formed in the rotor base 30a, a rotor axial projection 36, and/or a rotor radial projection 38 of the rotor base 30a. Each rotor groove 39, 39a may extend around the entire feature on which the rotor groove 39, 39a is formed, such that the rotor groove 39, 39a is an annular groove. Similarly, each rotor projection 36, 38 may extend around the entire rotor base 30a such that it is an annular rotor projection 36, 38. Additionally, a rotor axial and/or radial projection 36, 38 may extend from the rotor base 30a, a rotor axial projection 36, a rotor radial projection 38, a rotor axial groove 39, and/or a rotor radial groove 39a. As is evident from the various figures, rotor projections 36, 38 may cooperate to form rotor grooves 39, 39a and vice versa.

In an aspect, the shaft seal assembly 10 shown in FIGS. 9 and 9A may be configured such that a radial groove 29a formed in the stator 20 may correspond to a rotor radial groove 39a formed in the rotor base 30a on a generally axially interior portion of the shaft seal assembly 10 (i.e., toward the left side of FIGS. 9 and 9A). The shaft seal assembly 10 may also be configured such that another radial groove 29a formed in the stator 20 may correspond to a rotor radial groove 39a formed in the rotor body 31 at an axial and radial position interior of the shaft seal assembly 10 with respect to both a first axial interface gap 34a and a first radial interface gap 34b. However, the rotor body 31, rotor base 30a, and stator 20a may be differently configured without limitation unless so indicated in the following claims.

Still generally referring to FIGS. 9 and 9A, the stator 20 may be formed with a stator O-ring groove 21a configured to accept a skate 18a. It is contemplated that the skate 18a, stator 20, and rotor base 30a may be configured such that a bottom tangent line on the skate 18a is approximately collinear with an exterior surface of the rotor base 30a adjacent the skate 18a. A compliant skate 18a may accommodate a certain amount of radial shaft 14 movement and/or other misalignment while simultaneously maintaining a minimum possible clearance between the stator 20 and the rotor base 30a adjacent an interior portion of the shaft seal assembly 10. This minimal clearance may help to coalesce lubricant mist back to a liquid form, and it may also mitigate excess grease (or other lubricant) from entering into any interfaces between the stator 20 and the rotor 30. The skate 18a may be constructed of a naturally lubricious, relatively soft, and relatively compliant material, including but not limited to PTFE.

The illustrative aspects of a shaft seal assembly 10 shown in FIGS. 6-12 may provide several benefits for various applications over the bearing isolator 10 shown in FIGS. 1-5. For example, in the shaft seal assembly 10 shown in FIGS. 6-12, because the recess ramp 54 may be angled other than perpendicularly with respect to the rotational axis of the shaft 14, the specific distance between the recess ramp 54 and recess outer surface 55 of the cooperating recess 51 with respect to the cross-sectional diameter of the cooperating ring 52 is not as critical as it is for various embodiments of the bearing isolator 10. That is, the configuration of the ring cavity 50 in the shaft seal assembly 10 shown in FIGS. 6-12 may enhance the rotor's 30 ability to impart rotational energy to the cooperating ring 52 via the recess ramp 54 without the need for extremely critical tolerances between the edges of the cooperating ring 52 and various surfaces of the ring cavity 50. In certain illustrative aspects of the shaft seal assembly 10, the rotor 30 may induce rotation of the cooperating ring 52 via elastomeric tension of the cooperating ring 52 itself rather than relying on a dimensional tolerance of a feature formed in the rotor 30 with respect to the cross-sectional width of the cooperating ring 52.

Another advantage of a shaft seal assembly 10 shown in FIGS. 6-12 may have is that the cooperating ring 52 may contact multiple surfaces when the shaft 14 is not rotating. As shown in FIGS. 6-9A (which provide a representation of the shaft seal assembly 10 when the shaft 14 is not rotating) and as may be evident from FIGS. 11A, 11B, & 11C, the cooperating ring 52 may simultaneously engage at least a recess ramp 54, an axial surface 56c, and an angled surface 56b.

When the shaft 14 is rotating, which causes the rotor 30 to rotate, the recess ramp 54 formed in the cooperating recess 51 may impart rotational energy to the cooperating ring 52, which may cause the cooperating ring 52 to expand circumferentially into the cooperating recess 51, which may cause the cooperating ring 52 to engage one or more surfaces of the cooperating recess 51 (e.g., one or both of the recess outer surfaces 55, a vertex 51a, 51b, a recess ramp 54, etc. and/or combinations thereof). This expansion also may cause the cooperating ring 52 to disengage the recess ramp 54, an axial surface 56c, and/or an angled surface 56b.

In an aspect, the functionality of the shaft seal assembly 10 may be less sensitive to relative axial movement and/or displacement between the rotor 30 and stator 20 than designs in the prior art. Even when the rotor 30 is moved in an outward-axial direction with respect to the stator 20, the cooperating ring 52 may remain in contact with one recess outer surface 55, the recess ramp 54 formed in the cooperating projection 56, an angled surface 56b, and/or an axial surface 56c. However, other configurations may be used without limitation unless so indicated in the following claims.

Furthermore, the design of a shaft seal assembly 10 may be easier to assemble when compared to designs found in the prior art. This may be true because the configuration of the various surfaces of the ring cavity 50 may be such that the cooperating ring 52 experiences less shearing force when the rotor 30 is engaged with the stator 20.

Finally, for a given axial dimension, the shaft seal assembly 10 may be configured with more features to mitigate contaminant ingress and/or lubricant egress as compared to designs found in the prior art. This potential benefit may be a result of the fact that the illustrative aspects of the shaft seal assembly 10 may have a ring cavity 50 with at least a portion thereof located in an area of the stator 20 and/or rotor 30 that would have gone unused in the bearing isolator 10.

The materials used to construct the shaft seal assembly 10 and various elements and/or components thereof will vary depending on the specific application thereof, but it is contemplated that polymers, metals, metal alloys, natural materials, fibrous materials, and/or combinations thereof may be especially useful in some applications. Accordingly, the above-referenced elements may be constructed of any material known to those skilled in the art or later developed, which material is appropriate for the specific application of the present disclosure without departing from the spirit and scope of the present disclosure unless so indicated in the following claims. Further, the O-ring(s) 18 and/or skates 18*a* may be constructed of any material suitable for the specific application of the shaft seal assembly 10, which material includes but is not limited to polymers with embedded metallic features, synthetic materials, elastomers, natural materials, and/or combinations thereof without limitation unless so indicated in the following claims.

The cooperating ring 52 may be constructed of a solid toroid formed from a nitrile or flora-elastomer material, such as viton, which is manufactured by Du Pont. The cooperating ring 52 may be formed to have a low durometer hardness, shore A, ranging from 40-70 so that the cooperating ring 52 is resiliently deformable. However, other materials may be used to construct the cooperating ring 52 without limitation unless so indicated in the following claims. The cooperating ring 52 may be configured such that it may increasingly deform and lift away from engagement with the stator 20 as the centrifugal forces increase. These centrifugal forces increase in squared proportion to the linear speed of the moving cooperating ring 52.

Having described preferred aspects of the various methods and apparatuses, other features of the present disclosure will undoubtedly occur to those versed in the art, as will numerous modifications and alterations in the embodiments as illustrated herein, all of which may be achieved without departing from the spirit and scope of the present disclosure. Accordingly, the methods and embodiments pictured and described herein are for illustrative purposes only, and the scope of the present disclosure extends to all method and/or structures for providing the various benefits and/or features of the shaft seal assemblies unless so indicated in the following claims. Furthermore, the methods and embodiments pictured and described herein are no way limiting to the scope of the bearing isolator 10 and/or explosion-proof current diverting device 10' unless so stated in the following claims.

Any dimensions are for illustrative purposes only and in no way limit the scope of the present disclosure. It should be noted that the shaft seal assembly 10 and various elements thereof are not limited to the specific embodiments pictured and described herein, but are intended to apply to all similar apparatuses and methods for mitigating and/or preventing ingress of contaminants and/or egress of lubricants, or which similar apparatuses and methods provide other benefits or features of the shaft seal assembly 10 and/or a component thereof. Modifications and alterations from the described embodiments will occur to those skilled in the art without departure from the spirit and scope of the shaft seal assembly 10.

Any of the various features, components, functionalities, advantages, aspects, configurations, etc. for the shaft seal assembly 10 disclosed in the present application may be used alone or in combination with one another depending on the compatibility of the features. Accordingly, an infinite number of variations of shaft seal assembly exist. Modifications and/or substitutions of one feature, component, functionality, aspect, configuration, etc. for another in no way limit the scope of shaft seal assembly 10 unless so indicated in the following claims.

It is understood that the shaft seal assembly as disclosed herein extends to all alternative combinations of one or more of the individual features mentioned, evident from the text and/or drawings, and/or inherently disclosed. All of these different combinations constitute various alternative aspects of the shaft seal assembly 10, and/or components thereof. The embodiments described herein explain the best modes known for practicing the shaft seal assembly 10 and/or components thereof and will enable others skilled in the art to utilize the same. The claims are to be construed to include alternative embodiments to the extent permitted by the prior art.

While the shaft seal assembly 10 and components thereof have been described in connection with preferred aspects and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

The invention claimed is:

1. A shaft seal assembly comprising:
   a. a stator configured for engagement with an equipment housing, said stator comprising:
      i. a stator body;
      ii. a cooperating projection extending from said stator body;
   b. a rotor configured for engagement with a shaft having an axis of rotation and extending from and rotatable with respect to said equipment housing, said rotor comprising:
      i. a rotor body;
      ii. a cooperating recess, wherein said cooperating recess and said cooperating projection form a ring cavity;
   c. a cooperating ring positioned in said ring cavity, said ring cavity comprising:
      i. a radial vertex at a radially outward point of said cooperating recess;
      ii. a first recess outer surface extending away from said radial vertex in a generally axially inward and radially inward direction, wherein said first recess outer surface is oriented such that it is angled with respect to said axis of rotation of said shaft and a plane normal to said axis of rotation of said shaft; and
      iii. a recess ramp extending away from an axial vertex in a generally radially and axially inward direction, wherein said recess ramp is oriented such that it is angled with respect to said axis of rotation of said shaft and said plane normal to said axis of rotation of said shaft.

2. The shaft seal assembly according to claim 1 wherein said ring cavity further comprises an inflection point at a terminus of said recess ramp opposite said axial vertex.

3. The shaft seal assembly according to claim 2 wherein said ring cavity further comprises a recess lip at a terminus of said first recess outer surface opposite said radial vertex.

4. The shaft seal assembly according to claim 3 wherein said ring cavity further comprises an angled surface, wherein said angled surface is formed on said cooperating projection.

5. The shaft seal assembly according to claim 4 wherein said ring cavity further comprises a second angled surface, wherein said second angled surface is formed on said cooperating projection.

6. The shaft seal assembly according to claim 5 wherein said cooperating projection further comprises a radial surface, wherein said radial surface is positioned adjacent said angled surface.

7. The shaft seal assembly according to claim 6 wherein said cooperating projection further comprises a terminal surface, wherein said terminal surface is positioned adjacent said rotor.

8. The shaft seal assembly according to claim 7 wherein said ring cavity further comprises an axial surface, wherein said axial surface is positioned between said second angled surface and said terminal surface, and wherein said axial surface is formed on said cooperating projection.

9. The shaft seal assembly according to claim 8 further comprising a cooperating interface between said stator and said rotor, wherein said cooperating interface is radially inward with respect to said ring cavity.

10. The shaft seal assembly according to claim 9 wherein said cooperating interface is further defined as being positioned between said terminal surface and a rotor radial projection extending in a radially inward direction beyond said inflection point.

11. The shaft seal assembly according to claim 10 wherein said rotor further comprises a rotor axial projection, and wherein said cooperating recess is further defined as being formed in a portion of said rotor axial projection.

12. The shaft seal assembly according to claim 11 wherein an axially inward surface of said rotor axial projection is further defined as being positioned adjacent said radial surface of said cooperating projection.

13. The shaft seal assembly according to claim 12 wherein said radial vertex and said axial vertex are further defined as being smooth.

14. The shaft seal assembly according to claim 13 wherein said first and second recess outer surfaces are further defined as being angled with respect to one another by an amount greater than ninety degrees.

15. The shaft seal assembly according to claim 13 wherein said second recess outer surface and said recess ramp are further defined as being angled with respect to one another by an amount greater than ninety degrees.

16. The shaft seal assembly according to claim 13 wherein said recess ramp is further defined as being angled between three and forty-five degrees with respect to said plane normal to said axis of rotation of said shaft.

17. The shaft seal assembly according to claim 1 further comprising a second recess outer surface extending away from said radial vertex in a generally radially inward and axially outward direction, wherein said second recess outer surface is oriented such that it is angled with respect to said axis of rotation of said shaft and said plane normal to said axis of rotation of said shaft.

18. The shaft seal assembly according to claim 17 wherein the axial vertex is at a terminus of said second recess outer surface opposite said radial vertex.

\* \* \* \* \*